(12) United States Patent
Drawert

(10) Patent No.: US 10,984,481 B1
(45) Date of Patent: Apr. 20, 2021

(54) SYSTEMS AND METHODS FOR DETERMINING PREMIUM RATE FOR SEMI-AUTONOMOUS AND/OR AUTONOMOUS VEHICLES

(71) Applicant: United Services Automobile Association (USAA), San Antonio, TX (US)

(72) Inventor: Steven Thomas Drawert, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 52 days.

(21) Appl. No.: 16/130,654

(22) Filed: Sep. 13, 2018

Related U.S. Application Data

(60) Provisional application No. 62/559,193, filed on Sep. 15, 2017.

(51) Int. Cl.
  *G06Q 40/08* (2012.01)
  *G05D 1/00* (2006.01)
  *G06Q 50/30* (2012.01)
  *G07C 5/00* (2006.01)

(52) U.S. Cl.
  CPC ........... *G06Q 40/08* (2013.01); *G05D 1/0088* (2013.01); *G06Q 50/30* (2013.01); *G07C 5/008* (2013.01); *G05D 2201/0213* (2013.01)

(58) Field of Classification Search
  CPC ...... G06Q 40/08; G06Q 50/30; G05D 1/0088; G05D 2201/0213; G07C 5/008; B60W 60/0059
  See application file for complete search history.

(56) References Cited

U.S. PATENT DOCUMENTS 5,797,134 A * 8/1998 McMillan ............... G07C 5/008
  705/400
9,767,516 B1 * 9/2017 Konrardy ........... G06Q 10/0635
9,805,423 B1 * 10/2017 Konrardy ......... G08G 1/096741
(Continued)

FOREIGN PATENT DOCUMENTS

WO WO-2011146466 A2 * 11/2011 ............. G06Q 40/08

OTHER PUBLICATIONS

V. Dhar, "Equity, Safety, and Privacy in the Autonomous Vehicle Era," in Computer, vol. 49, No. 11, pp. 80-83, Nov. 2016, doi: 10.1109/MC.2016.326. (Year: 2016).*

*Primary Examiner* — Mike Anderson
*Assistant Examiner* — Bolko M Hamerski
(74) *Attorney, Agent, or Firm* — Fletcher Yoder, P.C.

(57) ABSTRACT

A system that includes a vehicle system that monitors characteristics of an autonomous and/or semi-autonomous driving program. The system includes a processor that receives a first set of data from the vehicle system. The first set of data is associated with the autonomous and/or semi-autonomous driving program. The processor determines a rate premium based on the first set of data. The processor then displays a visualization that includes the rate premium on a display. The processor receives a second set of data from the vehicle system. The second set of data is associated with monitored performance of the autonomous and/or semi-autonomous driving program. The processor adjusts the rate premium based on the second set of data and displays an adjusted rate premium.

20 Claims, 7 Drawing Sheets

(56) References Cited

U.S. PATENT DOCUMENTS

| | | | |
|---|---|---|---|
| 9,972,054 B1* | 5/2018 | Konrardy | B60W 50/0205 |
| 10,089,695 B1* | 10/2018 | Myers | G16H 10/60 |
| 10,540,723 B1* | 1/2020 | Potter | B60W 40/09 |
| 2004/0117081 A1* | 6/2004 | Mori | G01S 5/02 |
| | | | 701/1 |
| 2017/0234689 A1* | 8/2017 | Gibson | G05D 1/0061 |
| | | | 701/25 |

* cited by examiner

SYSTEMS AND METHODS FOR DETERMINING PREMIUM RATE FOR SEMI-AUTONOMOUS AND/OR AUTONOMOUS VEHICLES

CROSS-REFERENCE TO RELATED APPLICATION

This application claims priority to and the benefit of U.S. Provisional Application No. 62/559,193, entitled "SYSTEMS AND METHODS FOR DETERMINING PREMIUM RATE FOR SEMI-AUTONOMOUS AND/OR AUTONOMOUS VEHICLES," filed Sep. 15, 2017, which is hereby incorporated by reference in its entirety for all purposes.

BACKGROUND

The present disclosure relates generally to systems and methods for determining/generating insurance premium rates for semi-autonomous and/or autonomous vehicles.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system that includes a vehicle system that monitors characteristics of an autonomous driving program and one or more monitor variables related to a semi-autonomous and/or autonomous vehicle. The system includes a processor that receives a selection of the one or more monitor variables to monitor. The processor also receives a first set of data from the vehicle system. The first set of data is associated with the selection of the one or more monitor variables. The processor determines a rate premium based on the first set of data and characteristics of the autonomous driving program and displays a visualization that includes the rate premium on a display. The processor receives a second set of data from the vehicle system. The second set of data is associated with the selection of the one or more monitor variables after receiving the first set of data. The processor then adjusts the rate premium based on the second set of data and the characteristics of the autonomous driving program, and displays an adjusted rate premium.

In another embodiment, a system that includes a vehicle system that monitors characteristics of an autonomous and/or semi-autonomous driving program. The system includes a processor that receives a first set of data from the vehicle system. The first set of data is associated with the autonomous and/or semi-autonomous driving program. The processor determines a rate premium based on the first set of data. The processor then displays a visualization that includes the rate premium on a display. The processor receives a second set of data from the vehicle system. The second set of data is associated with monitored performance of the autonomous and/or semi-autonomous driving program. The processor adjusts the rate premium based on the second set of data and displays an adjusted rate premium.

In another embodiment, a system that includes a vehicle that operates in semi-autonomous or autonomous driving modes. The vehicle includes one or more sensors that collect data related to operation of the vehicle. The system includes a processor that receives the data from one or more sensors and processes the data in response to an accident to determine accident liability. A transmitter couples to the processor. The transmitter receives a determination of accident liability from the processor and wirelessly transmits the determination of accident liability.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Insurance premium rates are commonly determined on a semi-annual or annual basis for any applicant(s) based on certain information regarding the applicant(s) and the type of insurance that the applicant(s) is seeking. For instance, when determining a vehicle insurance premium rate for an applicant(s), a computing system may analyze a driving record of the applicant(s), information regarding the vehicle being insured, the amount of miles that the applicant(s) expects to drive, and the like. Using this information, the computing system generates a premium rate. However, as semi-autonomous and autonomous vehicles become more common, insurance premium rates will take into account additional data in order to determine an appropriate insurance premium rate. The additional data may include how various semi-autonomous and/or autonomous vehicles perform in different conditions. These conditions may include weather, environments (e.g., urban, suburban, and rural environments), lane layouts, traffic, time of day, etc. The additional data may also include the type of operating systems and/or software versions and how well they control various vehicles in the different conditions described above. Insurance premium rates may also take into account how often the vehicle is driven in different modes. For example, how often is the vehicle driven in a manual mode, a semi-autonomous mode, and/or an autonomous mode.

In some embodiments, the premium rate may need to take into account fractional ownership and/or use of semi-autonomous and/or autonomous vehicles. For example, a vehicle may have multiple owners or users that drive the vehicle for different amounts of time and in different environments/conditions. This information may also be collected and then used to determine how much of an insurance premium rate is to be allocated among multiple drivers/owners.

Figure 1:
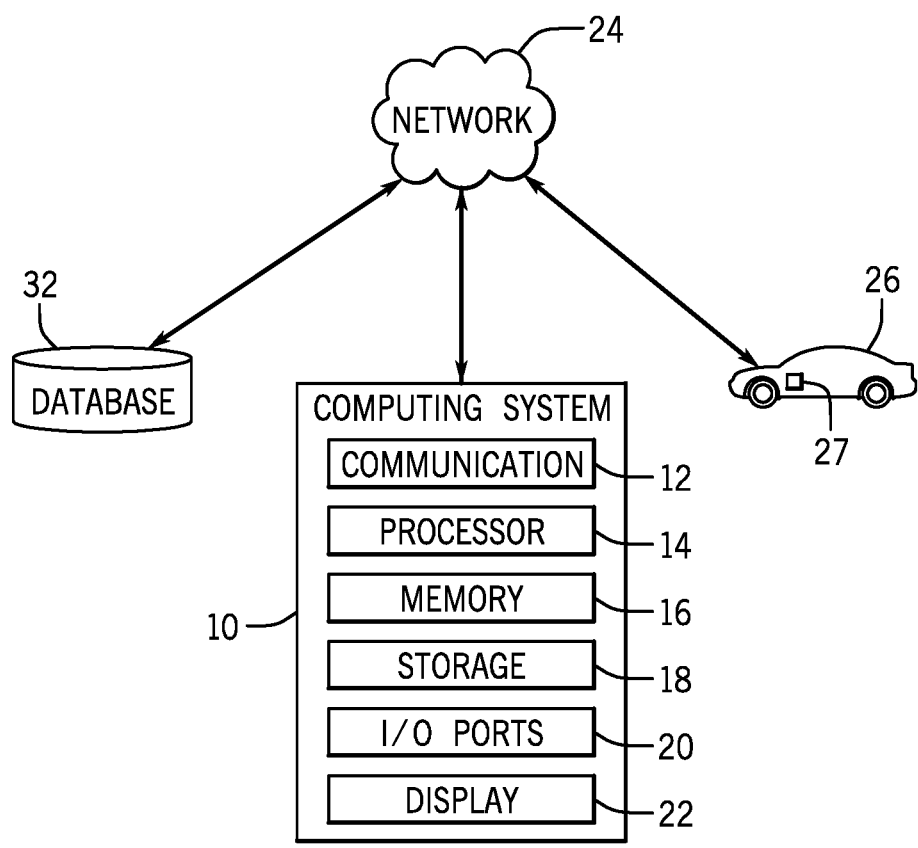
FIG. 1 illustrates a block diagram of a computing system communicatively coupled to a number of data sources, in accordance with embodiments described herein.

By way of introduction, FIG. 1 is a block diagram of a computing system 10 communicatively coupled to a variety of data sources that may assist the computing system 10 in determining premium rates for insurance policies for semi-autonomous and autonomous vehicles. The computing system 10 may include any suitable computer device, such as a general-purpose personal computer, a laptop computer, a tablet computer, a mobile computer, and the like that is configured in accordance with present embodiments. The computing system 10 may include various types of components that may assist the computing system 10 in performing various types of computer tasks and operations. For example, the computing system 10 may include a communication component 12, a processor 14, a memory 16, a storage 18, input/output (I/O) ports 20, a display 22, and the like. The communication component 12 may be a wireless or wired communication component that may facilitate communication between the computing system 10 and various other computing systems via a network, the Internet, or the like.

The processor 14 may be any type of computer processor or microprocessor capable of executing computer-executable code. The processor 14 may also include multiple processors that may perform the operations described below.

The memory 16 and the storage 18 may be any suitable articles of manufacture that can serve as media to store processor-executable code, data, or the like. These articles of manufacture may represent computer-readable media (e.g., any suitable form of memory or storage) that may store the processor-executable code used by the processor 14 to perform the presently disclosed techniques. As used herein, applications may include any suitable computer software or program that may be installed onto the computing system 10 and executed by the processor 14. The memory 16 and the storage 18 may represent non-transitory computer-readable media (e.g., any suitable form of memory or storage) that may store the processor-executable code used by the processor 14 to perform various techniques described herein. It should be noted that non-transitory merely indicates that the media is tangible and not a signal.

The I/O ports 20 may be interfaces that may couple to other peripheral components such as input devices (e.g., keyboard, mouse), sensors, input/output (I/O) modules, and the like. The display 22 may operate as a human machine interface (HMI) to depict visualizations associated with software or executable code being processed by the processor 14. In one embodiment, the display 22 may be a touch display capable of receiving inputs from a user of the computing system 10. The display 22 may be any suitable type of display, such as a liquid crystal display (LCD), plasma display, or an organic light emitting diode (OLED) display, for example. Additionally, in one embodiment, the display 22 may be provided in conjunction with a touch-sensitive mechanism (e.g., a touch screen) that may function as part of a control interface for the computing system 10.

It should be noted that the components described above with regard to the computing system 10 are exemplary components and the computing system 10 may include additional or fewer components as shown.

In certain embodiments, the computing system 10 may be communicatively coupled to a network 24, which may include a collection of computing systems, the Internet, an Intranet system, or the like. The network 24 may facilitate communication between the computing system 10 and various other data sources. For instance, the network 24 may be communicatively coupled to a vehicle system 26. In some embodiments, the network 24 may also be communicatively coupled to one or more databases 32, which may store data regarding the operation of semi-autonomous and autonomous vehicles. The databases 32 may include information such as what kind of operating system a particular semi-autonomous and/or autonomous vehicle is using, software versions of the operating system, etc. The databases 32 may also store performance information of various vehicles related to particular operating systems and software versions of the operating systems.

For example, the databases 32 may store information regarding the performance of the semi-autonomous and/or autonomous vehicles in a variety of settings such as urban driving, suburban driving, rural driving, off-road driving, mountain road driving, performance in different kinds of weather (e.g., snow, fog, rain, hail), performance on different kinds of roads (e.g., concrete, asphalt, dirt, gravel), performance on different kinds of lane layouts (e.g., single lane, multilane), performance on different kinds of road layouts, performance in construction zones, performance while pulling a trailer, etc. All this information may be linked to specific operating systems and/or versions of the operating systems for the semi-autonomous and/or autonomous vehicles, which may facilitate an appropriate premium determination for operating a particular type of semi-autonomous and/or autonomous vehicle. For example, if a particular vehicle with operating system A is known to have problems (e.g., crashes, fender benders) driving in an urban setting, that information may be stored by the databases 32 and used in determining an insurance premium for an owner that will use the vehicle in an urban environment. Likewise, if a particular vehicle using operating system B is known to perform well in snowy conditions, that information may also be accessed by the databases 32 in determining an appropriate insurance premium for an owner that will use the vehicle in a snowy environment.

Referring back to the vehicle system 26, in certain embodiments, the vehicle system 26 may monitor the operation of the vehicle. For instance, the vehicle system 26 may monitor its performance in a variety of contexts and situations, including the same context and situations described above in reference to the databases 32. For example, the vehicle system 26 may include one or more sensors 27 that detect performance of the vehicle on different types of roads, in different weather conditions, in urban settings, suburban settings, rural settings, etc. This information may then be used by the computing system 10 in adjusting and/or calculating an appropriate insurance premium for the owner.

In some embodiments, the sensors 27 may assist the computing system 10 in determining which operating system and/or version is being used by the vehicle. For example, the version and/or operating system of the vehicle may not be known by the computing system 10. In one embodiment, in order to determine this information, the sensors 27 collect information on how the vehicle brakes, how it accelerates, how it turns, etc. The computing system 10 may then associate these particular characteristics of the vehicle with an operating system and/or version being used by the vehicle to determine an appropriate insurance premium. For example, makers of the vehicles and/or the operating systems may know the operating characteristics of semi-autonomous and/or autonomous vehicles using a particular operating system and/or version of that operating system. The computer system 10 may retrieve this information and compare it to monitored characteristics of the vehicle to determine an operating system and/or software version. In some embodiments, this may enable the computing system 10 to determine whether the latest version of the operating system has been installed as well as how the software version performs over time.

The computing system 10 may also monitor the driver's performance in a manual mode in combination with the performance of the vehicle when operating in a semi-autonomous and/or autonomous mode. To track this information, the vehicle system 26 may include similar components as the computing system 10 described above. In addition, the vehicle system 26 may be communicatively coupled to various sensors 27 on the vehicle to acquire data regarding the operation of the vehicle when driven by the driver in a manual mode. By way of example, the vehicle system 26 may be communicatively coupled to a global positioning system (GPS) of the vehicle, a speedometer of the vehicle, a temperature sensor of the vehicle, accelerometer, and other sensors that may provide information regarding the operation or location of the vehicle.

The computing system 10 may also track how often the vehicle system 26 switches between manual, semi-autonomous, and autonomous modes in order to determine an appropriate premium based on a particular usage of the vehicle. For example, if a particular owner drives his vehicle 70% of the time in a manual mode, 10% of the time in a semi-autonomous mode, and the remaining 20% of time in an autonomous mode the premium may be different than an owner that drives his vehicle 90% of the time in an autonomous mode and the remaining time in a manual mode.

Figure 2:
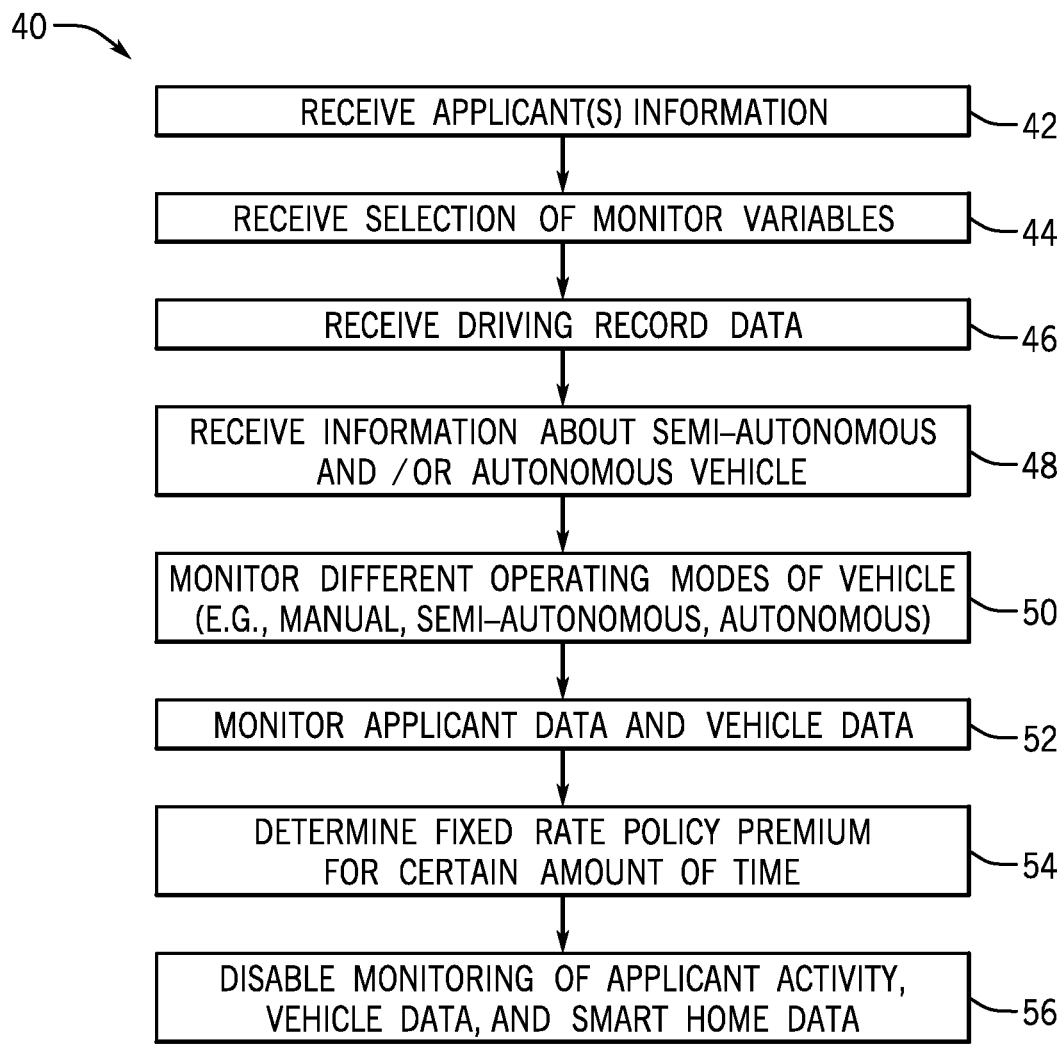
FIG. 2 illustrates a flow chart of a method for determining a fixed rate policy premium based on the data acquired from the data sources of FIG. 1, in accordance with embodiments described herein.

With the foregoing in mind, FIG. 2 illustrates a flow chart of a method 40 for determining a fixed rate and/or adjustable policy premium based on the data acquired from the vehicle system 26, the databases 32, and the like. Although the method 40 is described in a particular order, it should be noted that the method 40 may be performed in any suitable order and is not limited to the order presented herein. It should also be noted that each block described below in the method 40 may be performed by the computing system 10.

Referring now to FIG. 2, at block 42, the computing system 10 may receive applicant(s) information regarding the individual seeking insurance and/or individuals that have an ownership interest in the vehicle (e.g., fractional ownership). The applicant(s) information may include a type of insurance that the applicant(s) are seeking. For instance, the applicant(s) may be interested in basic coverage, full coverage, etc. In some embodiments, the applicant(s) may provide additional information relevant to an insurance provider for providing the listed insurance policies. By way of example, the applicant(s) information may include health information such as the applicant(s)'s age, weight, and height. The applicant(s) information may also include information regarding the overall health such as whether he is a smoker, whether certain diseases are part of his family history, and other information that is collected by insurance providers when determining a premium rate for the applicant(s).

Figure 3:
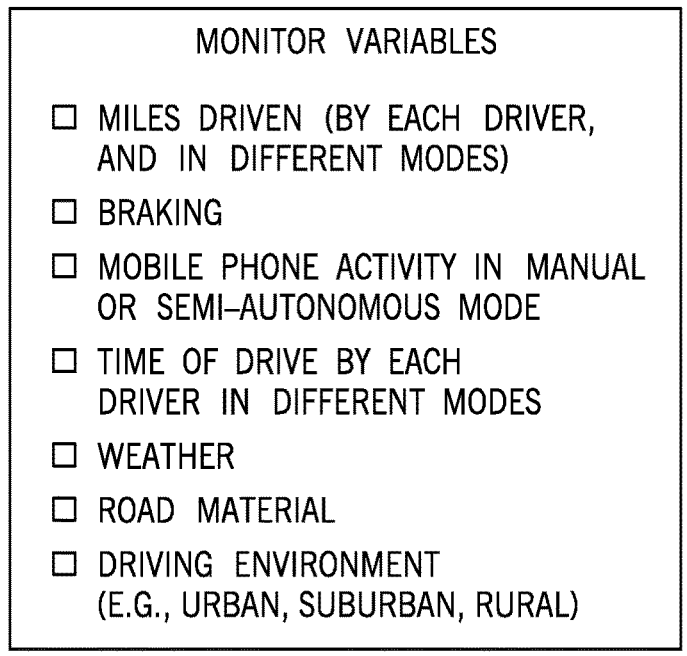
FIG. 3 illustrates an example visualization in a human machine interface (HMI) of a list of monitor variables that may be selected by the applicant(s) for determining the policy premium rate according to the method of FIG. 2, in accordance with embodiments described herein.

At block 44, the computing system 10 may receive a selection of monitor variables associated with the applicant(s) that the computing system 10 may monitor. The monitor variables may include various types of data acquired by the vehicle system 26. FIG. 3 illustrates an example interactive visualization 58 (e.g., a graphical user-interface (GUI)) of possible variables that may be monitored and/or selected for monitoring. The visualization 58 may be depicted via the display 22 of the computing system 10 or another computing system. The monitor variables listed in the visualization 58 may be related to obtaining vehicle insurance and may include an amount of miles driven (in the case of fractional ownership, how much is driven by each owner), the type of braking used, mobile phone activity while driving, the times at which the vehicle is driven, the weather during which the vehicle is driven, how often the driver switches between different operating modes (e.g., manual, semi-autonomous, autonomous), and the like.

After receiving the selection of monitor variables, the computing system 10, at block 46, may receive driving record data associated with the applicant(s). The driving record data may include information regarding previous accidents that the applicant(s) was a party of, citations received for vehicle operation, and the like. In certain embodiments, the driving record data may be received via the database 32. Alternatively, the applicant(s) may provide this information to the computing system 10 via a web-based application, a device coupled to the I/O ports 20, or the like.

At block 48, the computing system 10 may receive data about the semi-autonomous and/or autonomous vehicle. This data may include the type of operating system and/or version of the operating system and associated performance data. As explained above, the performance data may include performance of the semi-autonomous and/or autonomous vehicles in a variety of settings including urban driving, suburban driving, rural driving, off-road driving, mountain road driving, performance in different kinds of weather (e.g., snow, fog, rain, hail), performance on different kinds of roads (e.g., concrete, asphalt, dirt, gravel), performance on different kinds of lane layouts (e.g., single lane, multilane), performance on different kinds of road layouts, performance in construction zones, performance while pulling a trailer, etc.

At block 50, the computing system 10 may monitor different operating modes of the vehicle system 26. These operating modes may include manual, semi-autonomous, and autonomous modes of operation. The system 10 may monitor these operating modes in order to better assess insurance risk and the associated premium costs. For example, a particular owner may drive his vehicle in a manual mode 70% of the time while splitting the remaining drive time between semi-autonomous and autonomous driving modes. If this particular driver has a below average driving record then the insurance premium will take into account that the vehicle is predominantly driven in the manual mode. Similarly, if the vehicle is predominantly driven in an autonomous mode or semi-autonomous mode (e.g., 80%) and the vehicle and its operating system perform well, then the insurance premium will likewise reflect the capability/track record of the vehicle and the operating system/version.

After receiving the selection of monitor variables and the data discussed above, at block 52, the computing system 10 may begin monitoring the monitor variables. In some embodiments, these variables may be selected by the applicant(s) at block 44 for a certain period. For example, braking, acceleration, and mobile phone activity while driving may be selected for monitoring over a period of a month. As such, the computing system 10 receives data from the vehicle system 26 and the databases 32; the computing system 10 may verify whether the data provided by the applicant(s) is accurate as well as taking into account additional data about the vehicle (e.g., operating system, version of operating system) from the databases 32. In some embodiments, after receiving the data at blocks 42-50, the computing system 10 may assess a risk value or score to the applicant(s) for vehicle insurance, home insurance, and life insurance. The risk value may directly relate to the premium rate for each insurance type. By monitoring the applicant(s)'s activities for a period of time that is less than the fixed rate policy premium term, the computing system 10 may be capable of better assessing whether the risk value attributed to the applicant(s) is accurate. For instance, if the applicant(s) indicates that he has not received a citation related to operating his vehicle in the past three years and the computing system 10 receives data from the vehicle system 26 that the applicant(s) regularly drives above the speed limit, the computing system 10 may adjust the initial risk score determined for the applicant(s) based on the applicant(s)'s true driving behavior. Similarly, if additional data becomes available regarding the operation of the vehicle in semi-autonomous and autonomous modes (e.g., operating system, version of operating system) the computing system 10 may adjust the initial risk score based on the vehicle's true driving behavior. For example, if it is determined that an operating system update improves performance in an urban environment then the initial risk score may go down, or vice versa if the update reduces performance in an urban environment.

After monitoring the monitor variables for the defined amount of time, at block 54, the computing system 10 may determine a fixed rate policy premium value for vehicle insurance. As such, the computing system 10 may use the data acquired from blocks 42-52 to assess a risk value to insure the applicant(s) over the period of time associated with the fixed rate policy (e.g., one year, two years, three years). In some embodiments, to provide a fixed rate policy, the computing system 10 may account for various scenarios and situations that it may not consider when determining an annual policy rate. As such, the fixed rate premium will likely be higher than the premium obtained for a traditional annual policy plan. Although the price may be higher than traditional annual policy rates, some insurance customers may prefer the fixed rate plan to better anticipate and plan their respective budgets for more than one year. Moreover, some customers prefer to know that the policy rate will not increase over some period of time.

After determining the fixed rate policy premium, at block 56, the computing system 10 may disable the monitoring of the applicant(s). That is, the computing system 10 may refrain from receiving data from the vehicle system 26 and/or the databases 32. As such, the applicant(s) may maintain their privacy regarding the data available to the computing system 10, while maintaining a fixed rate premium for a number of years. In some embodiments, after determining the fixed rate premium, the computing system may also send a notification via an electronic service such as text or email indicating the fixed rate premium to a computing system associated with the applicant(s). As such, the applicant(s) may receive information regarding the determined fixed rate premium via a visualization presented on a display or by other suitable means.

Figure 4:
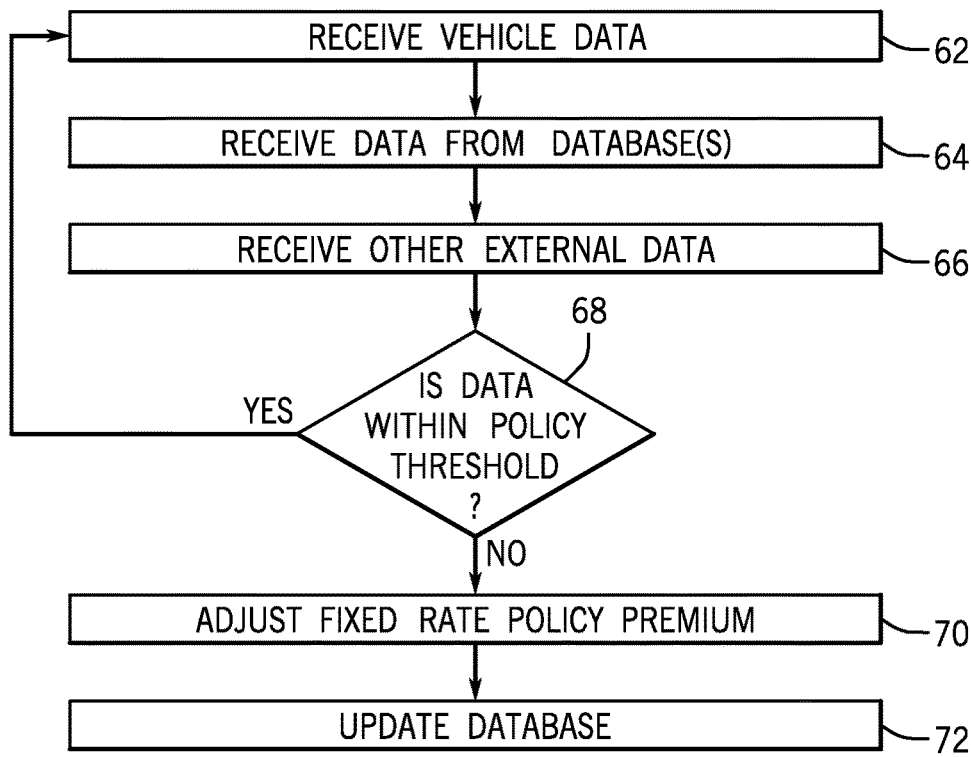
FIG. 4 illustrates a flow chart of a method for adjusting the fixed rate policy premium determined according to the method of FIG. 2, in accordance with embodiments described herein.

In some embodiments, during the monitoring period of block 52 of the method 40, the computing system 10 may perform the method 60 of FIG. 4. Referring to FIG. 4, at blocks 62, 64, and 66, the computing system 10 may receive vehicle data from the vehicle system 26, and data from the databases 32, as described above. In addition, in some embodiments, at block 66, the computing system 10 may receive other external data that may be relevant regarding the applicant(s). For example, the other external data may include information regarding the applicant(s)'s driving record, criminal record, and other publically available information. At block 68, the computing system 10 may determine whether the data is within a threshold associated with the policy premium. For example, the data acquired in blocks 62, 64, and 66 may be assembled (e.g., via an algorithm) to establish a score and the score may be compared to the threshold. In other embodiments, each piece of data may be compared to a respective threshold. In some embodiments, the computing system 10 may determine an initial fixed rate premium before the monitoring period of block 52 in the method 40 of FIG. 1. During the monitoring period of block 52, the computing system 10 may continuously perform block 68 of the method 60. When the data received at block 68 is not within the policy threshold, the computing system 10 may proceed to block 70 and adjust the value for the rate premium.

At block 72, the computing system 10 may update the database 32 or some storage device that stores information regarding a relationship between applicant(s) data received at blocks 42, 44, 46, 48, 50 as compared to monitored data received at blocks 62 and 64. The computing system 10 may use the relationship data to better determine the policy premium for other individuals that provide similar data.

Figure 5:
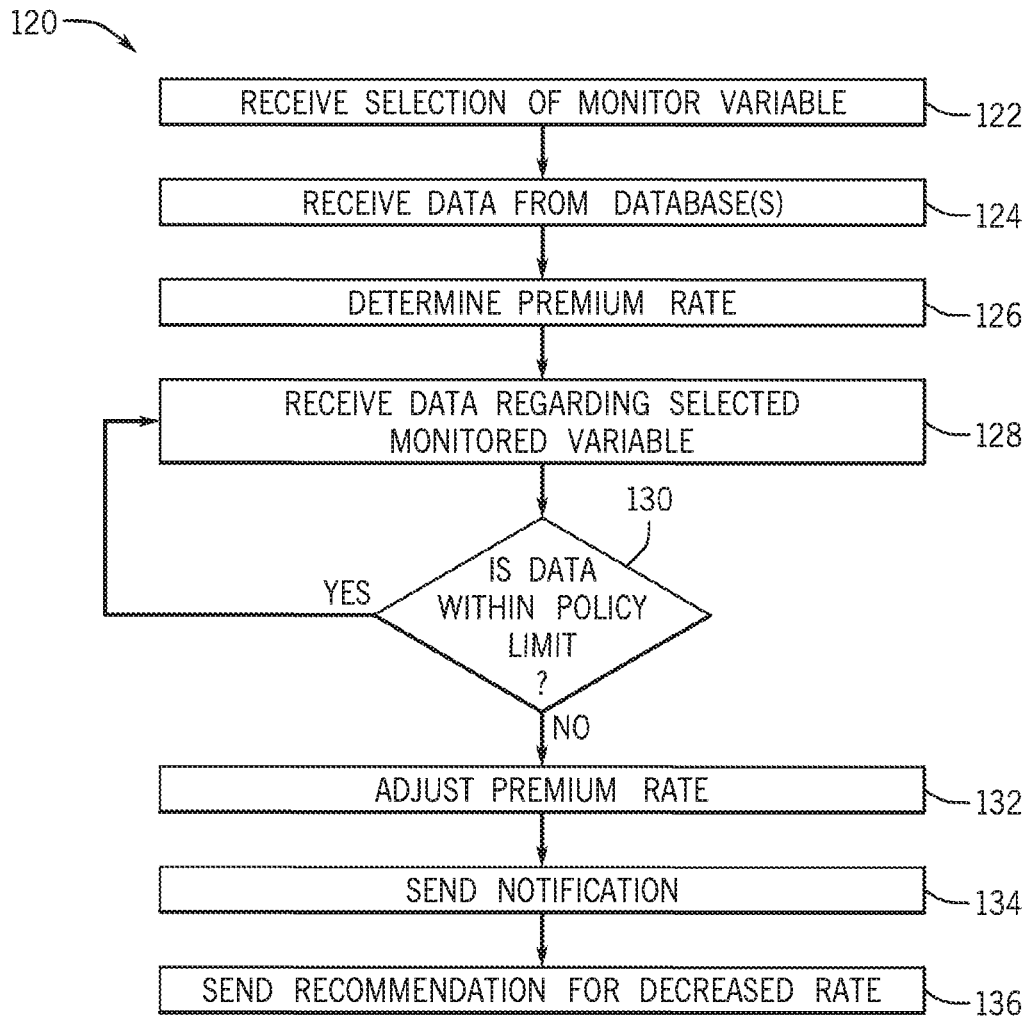
FIG. 5 illustrates a flow chart of a method for determining a variable rate policy premium based on monitor variables selected by an applicant(s), in accordance with embodiments described herein.

It should be noted that, in some embodiments, the method 60 may also be performed to adjust a variable rate premium for an insurance customer. In this case, the vehicle data and databases 32 may be continuously monitored by the computing system 10 even after the monitoring period described above. FIG. 5, for instance, illustrates a flow chart of a method 120 for adjusting a variable rate premium based on data received from the vehicle system 26.

Although the method 120 will be described as being performed by the computing system 10, it should be understood that any suitable computing system may perform the method 120. In addition, it should be noted that the method 120 is not limited to being performed in the presented order. Instead, the method 120 may be performed in any suitable order. Moreover, it should also be noted that each block of the method 120 may not be performed by the computing system 10.

Figure 6:
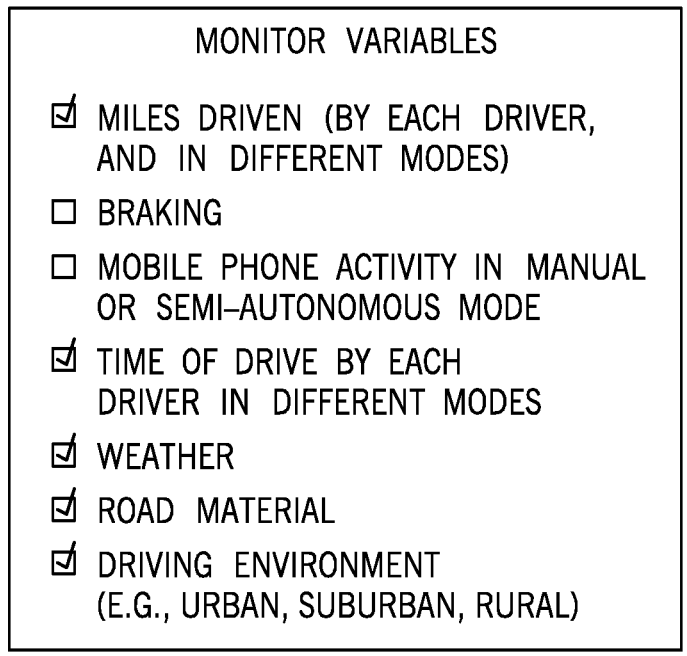
FIG. 6 illustrates an example visualization of certain monitor variables that have been selected by the applicant(s) with respect to the method of FIG. 5, in accordance with embodiments described herein.

Referring now to FIG. 5, at block 122, the computing system 10 may receive a selection of monitor variables, as described above with regard to block 44 of FIG. 2 and the visualization 58 of FIG. 3 discussed above. The monitor variables may indicate various types of data that the applicant(s) agrees to allow the computing system 10 to monitor with respect to determining a variable rate premium for vehicle insurance. FIG. 6 illustrates an example visualization of certain monitor variables that have been selected by the applicant(s) to be monitored with regard to determining the variable rate premium. As shown in FIG. 6, the applicant(s) has selected each option except braking and mobile phone activity. As such, the computing system 10, as will be described below, may perform the method 120 with regard to the selected monitored variables.

At block 124, the computing system 10 may retrieve data from the database(s) 32. As explained above, the database(s) 32 may store information about the performance of semi-autonomous and/or autonomous vehicles as well as information about the driver (e.g., driving record data). Using the selected monitor variables and data from the database(s), at block 126, the computing system 10 may determine an initial premium rate for vehicle insurance. The initial premium rate may be a rate that is expected to vary between certain amounts of time (e.g., weekly, bi-weekly, monthly, yearly). When determining the premium rate, the computing system 10 may cross-reference the driving record of the applicant(s) and performance of the semi-autonomous/autonomous vehicle, with the selected monitor variables. By way of example, if the driving record indicates that the applicant(s) has a number of citations for speeding and the applicant(s) did not select speed as a monitor variable, the computing system 10 may adjust the premium rate to account for an increased risk associated with the lack of the ability to monitor speed given the previous history of speed citations of the applicant(s). In some embodiments, the premium rate may be adjusted based on an update to the operating system that may either improve or reduce performance. For example, an update to the operating system may be associated with an improvement to safe operation of the vehicle. Accordingly, the premium rate may be adjusted to reflect that the semi-autonomous and/or autonomous vehicle with a specific operating system version is associated with fewer traffic incidents (e.g., accidents, traffic violations).

In some embodiments, after determining the premium rate, the computing system 10 may display a visualization indicating the determined premium rate via the display 22 or some other display device available to the applicant(s). For example, the computing system 10 may send a text message or an electronic-mail message to the applicant(s) such that the applicant(s) may be aware of the determined premium rate. In some embodiments, the applicant(s) may receive a visualization indicating the current rate via an application accessible via a mobile computing device such as a smart phone. In some embodiments, the computing system 10 may also suggest changes to the semi-autonomous and/or autonomous program (e.g., updating the version being used to reduce the rate).

Figure 7:
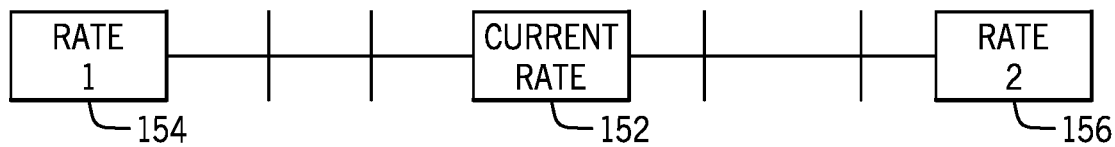
FIG. 7 illustrates an example visualization in an human interface machine (HMI) of a current rate of a variable rate policy premium that may vary based on data acquired from data sources of FIG. 1, in accordance with embodiments described herein.

With this in mind, FIG. 7 illustrates an example visualization 150 indicating a current rate 152 of the premium rate. In addition to the current rate 152, the visualization 150 may display a first rate 154 and a second rate 156 that correspond to a lower limit and an upper limit of the premium rate that the computing system 10 may calculate.

Figure 8:
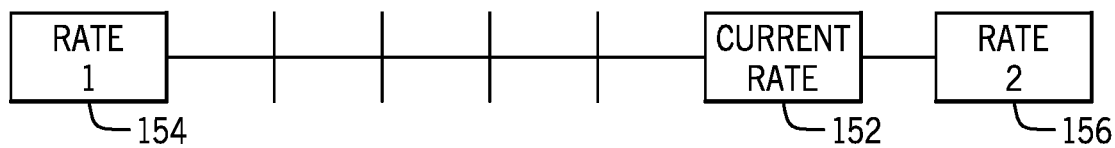
FIG. 8 illustrates an example visualization in an HMI of a current rate of a variable rate policy premium that increased with respect to the rate depicted in the visualization of FIG. 7, in accordance with embodiments described herein.
Figure 9:
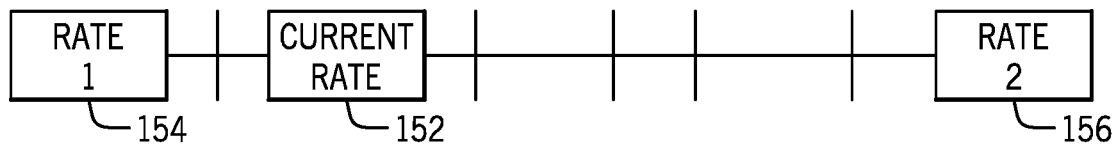
FIG. 9 illustrates an example visualization in an HMI of a current rate of a variable rate policy premium that decreased with respect to the rate depicted in the visualization of FIG. 7, in accordance with embodiments described herein.

Referring back to FIG. 5, at block 128, the computing system 10 may begin receiving data regarding the selected monitor variables via the vehicle system 26. At block 130, the computing system 10 may determine whether the received data corresponds to the expected values according to the policy. If the data is not within the expected values, the computing system 10 may proceed to block 132 and adjust the premium rate. FIG. 8, for example, illustrates a visualization 160 that indicates how the current rate 152 may increase relative to the circumstances of FIG. 2, when the data received at block 128 is not within the expected values of the policy. In the same manner, FIG. 9 illustrates a visualization 170 that depicts the current rate 152 decreasing relative to the circumstances of FIG. 7.

It should be noted that when the computing system 10 determines whether the received data corresponds to the expected values according to the policy, the computing system 10 may perform similar processes as described above with respect to FIGS. 2 and 4. That is, the processes described above for determining a fixed premium rate may also be employed to provide real-time adjustments in determining a variable premium rate with respect to the method 120 of FIG. 5.

At block 134, the computing system 10 may send a notification to the applicant(s) indicating the adjusted premium rate. As discussed above, the computing system 10 may send a notification via text message, e-mail message, a visualization depicted on a mobile computing device, or the like.

Figure 10:
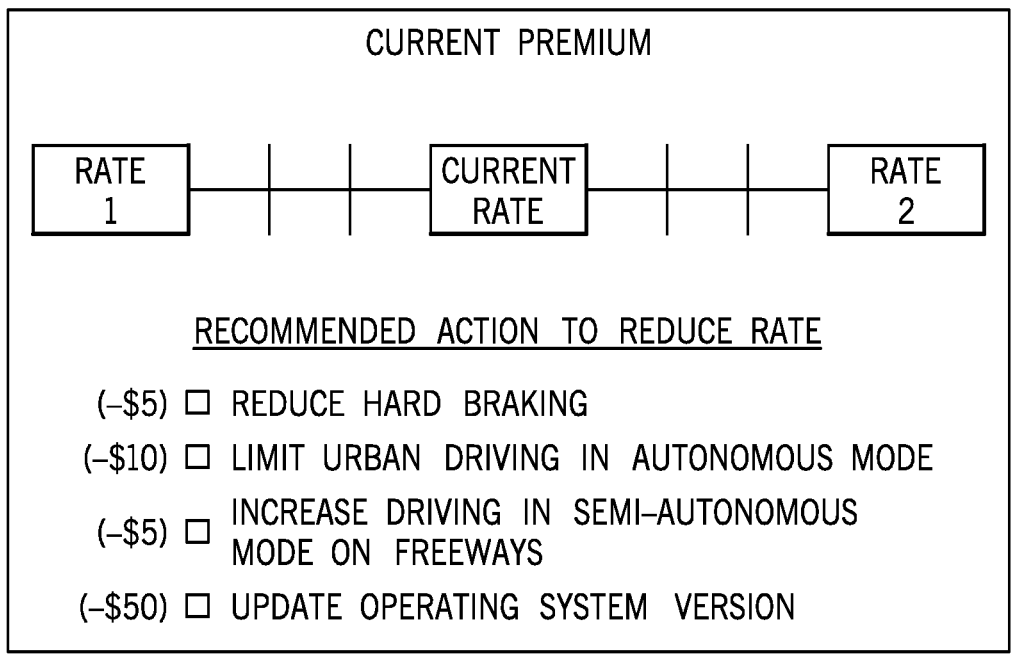
FIG. 10 illustrates an example visualization in an HMI depicting a current rate of a variable rate policy premium along with a list of recommended actions that may reduce the variable rate, in accordance with embodiments described herein.

After sending the notification, at block 136, the computing system 10 may send recommended actions for the applicant(s) to consider reducing the current rate 152. FIG. 10 illustrates an example visualization depicting a current rate 152 along with a list of recommended actions that may reduce the current rate 152. For instance, the computing system 10 may present a list of suggested actions that may reduce the current rate 152 along with a monetary value that corresponds to the amount in which the current rate may change. For instance, the computing system 10 may indicate that reducing the amount of times that the applicant(s) brakes abruptly may reduce the current rate 152 by $5, limiting urban driving in an autonomous mode may reduce the current rate 152 by $10, increase driving in semi-autonomous mode on freeway may reduce current rate 152 by $5, updating the operating system may reduce the current rate 152 by $50 (e.g., change the operating systems, update to latest version), and the like. The recommendations may be presented to the applicant(s) in the same manner as the notification of block 134 is presented.

Figure 11:
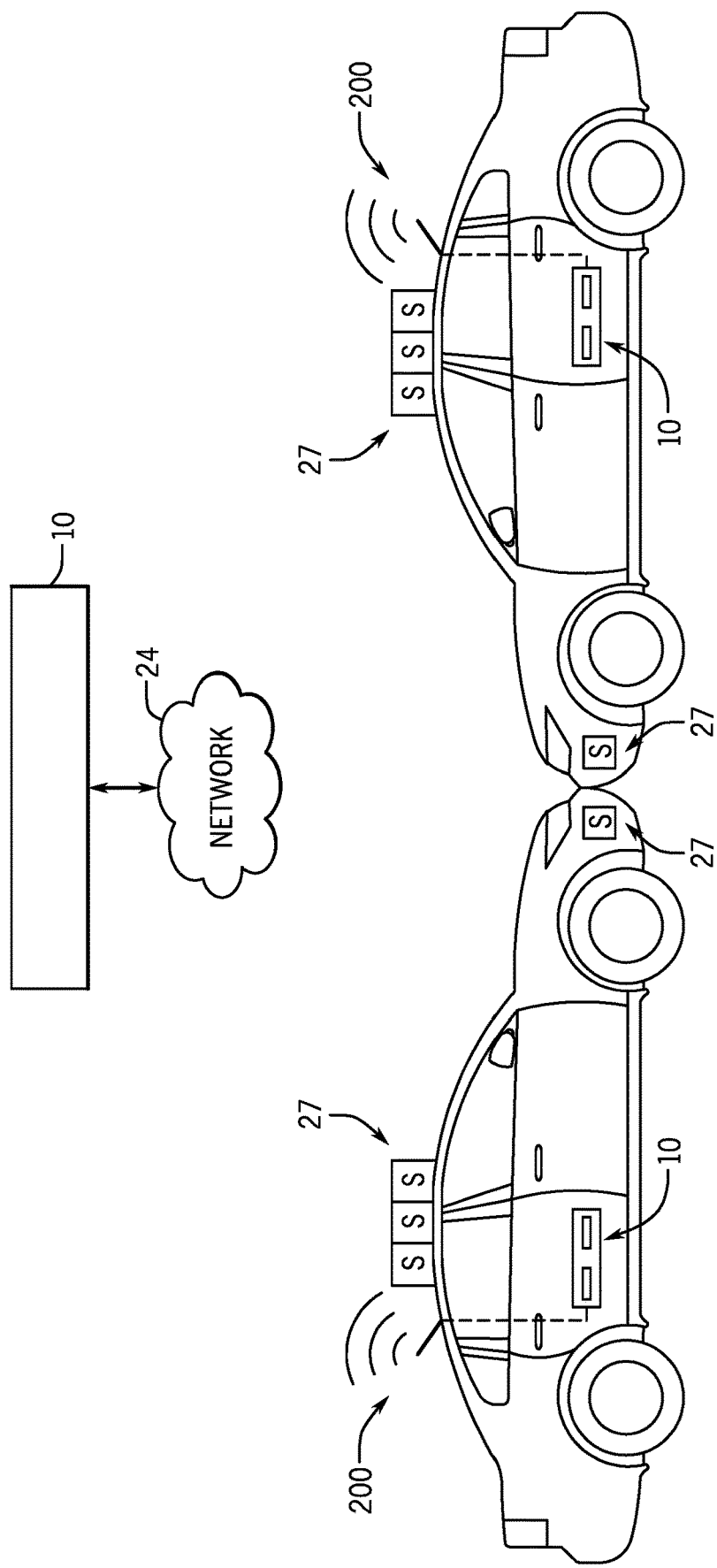
FIG. 11 illustrates an example of a car wreck between two vehicles, in accordance with embodiments described herein.

FIG. 11 illustrates an example car wreck between two vehicles. As explained above, the vehicle system 26 may monitor the operation of the vehicle in a variety of contexts and situations. These contexts and situations may include performance of the vehicle on different types of roads, in different weather conditions, in urban settings, suburban settings, rural settings, etc. The vehicle system 26 may also facilitate a determination of accident liability, level of damage, etc. in the event of an accident. As explained above, the vehicle system 26 may include one or more sensors 27 that monitor activity of the vehicle (e.g., speed of the vehicle) as well as the environment around the vehicle. The sensors 27 may include video cameras, infrared cameras, radar, lasers, accelerometers, speedometers, among others. During operation, the sensors 27 collect information about the environment around the vehicle including the location and operation of other vehicles, signs (e.g., stop signs, yield signs, traffic signs), traffic lights, etc. In the event of an accident, the vehicle system 26 may use the collected data from the sensors 27 to determine accident liability or provide a preliminary opinion on accident liability. For example, after an accident, a computing system 10 processes the data collected by the sensors 27 to facilitate determination or estimate liability. As illustrated, the computing system 10 may be on the vehicle and/or remotely located, enabling local and/or remote processing of the sensor data. If the computing system 10 is remotely located, data collected by the sensors 27 may be transmitted using a transmitter/receiver 200 through a network 24 for processing. The network 24 carrying this data may be a Wi-Fi network, a cellular network, a satellite network, or a combination thereof.

In order to determine (e.g., estimate) liability the computing system 10 may review the most recent traffic signs, speed of the vehicles, distances between vehicles, autonomous driving algorithm, algorithm usage history, the algorithm's recent decisions, among other information collected by the sensors 27. This information may then be used by the computing system 10 to determine fault by comparing the actions of the vehicles in relation to local traffic laws. A determination of fault may then be transmitted to one or both of the vehicles through the network 24 from the remotely located computing system 10. In some embodiments, the determination of fault may be transmitted to electronic devices of one or both of the vehicle driver/owners through the network 24 from the remotely located computing system 10 and/or the local computing system 10. In some embodiments, a determination of fault may be transmitted to one of the vehicles, which then retransmits the determination to the other vehicle and/or to an electronic device of the owner/driver of the other vehicle. If the computing system 10 is located on the vehicle, the computing system 10 may use the transmitter/receiver 200 to transmit the determination of fault to the other vehicle. In some embodiments, the computing system 10 may communicate with an electronic device of the driver/owner of the first vehicle enabling the driver/owner's electronic device to then communicate a determination of fault to the second vehicle, to an electronic device of the owner/driver of the second vehicle, or both.

In addition to determining fault, the computing system 10 may facilitate a determination of what needs to be repaired. For example, the computing system 10 may receive feedback from various sensors 27 that enable the computing system 10 to determine the location of damage as well as the extent of the damage on the vehicles. As explained above, the sensors 27 may include visual cameras, thermal cameras, etc. The computing system 10 may use images captured by these cameras to determine the location and extent of damage. In some embodiments, the computing system 10 may also receive feedback from sensors 27 (e.g., strain sensors) coupled to specific components within the vehicle (e.g., transmission, engine block, cooling system, fender, axle, windshield) that indicate whether a specific component is damaged. This information may then be used by the insurance provider to contact the repair shop and/or begin the process of ordering parts.

The technical effects of the systems and methods described herein include using data acquired from autonomous driving systems in conjunction with various sensors, and profile data to determine premium rates and to adjust the premiums rates in real-time or at regular intervals for semi-autonomous and/or autonomous vehicles.

Moreover, the present embodiments disclosed herein address post Internet problems such as using the data available via smart homes, smart cars, and wearable devices to provide sufficient insurance coverage for an applicant(s) based specifically on the applicant(s)'s behavior. Furthermore, the present embodiments improve the accuracy in determining an appropriate rate premium for insurance services by accounting for the behavior of individual applicant(s), as opposed to classifying applicant(s) in a general grouping of expected behavior.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:
1. A system, comprising:
    a vehicle system configured to monitor characteristics of an autonomous driving program and one or more user-selected monitor variables related to a semi-autonomous or autonomous vehicle via one or more sensors;
    a processor; and
    a memory storing computer-executable instructions, wherein the computer-executable instructions are configured to cause the processor to:
        receive, via a user selection, the one or more user-selected monitor variables to monitor;
        receive a first set of data from the vehicle system, wherein the first set of data corresponds to the one or more user-selected monitor variables;
        determine a rate premium based on the first set of data and characteristics of the autonomous driving program;
        display a visualization comprising the rate premium on a display;

in response to determining that reducing operation of the semi-autonomous or autonomous vehicle in a semi-autonomous or autonomous mode in a category of driving conditions decreases the rate premium, display a recommendation to reduce operation of the semi-autonomous or autonomous vehicle in the semi-autonomous or autonomous mode in the category of driving conditions;

receive a second set of data from the vehicle system, wherein the second set of data corresponds to the one or more user-selected monitor variables after receiving the first set of data;

determine accident liability using the first set of data, the second set of data, or both, in response to determining that an accident has occurred;

determine damage to the autonomous or semi-autonomous vehicle or to an additional vehicle involved in the accident using feedback from the one or more sensors;

transmit the determination of accident liability;

adjust the rate premium based on the second set of data the characteristics of the autonomous driving program, the accident liability, or any combination thereof; and display an adjusted rate premium.

2. The system of claim 1, wherein the one or more monitor variables comprises a number of miles driven by the semi-autonomous or autonomous vehicle in a manual mode and the semi-autonomous mode or autonomous mode.

3. The system of claim 1, wherein the computer-executable instructions are configured to cause the processor to display an additional recommendation to update the autonomous driving program to a latest version.

4. The system of claim 1, wherein the computer-executable instructions are configured to cause the processor to, in response to determining that increasing operation of the semi-autonomous or autonomous vehicle in the semi-autonomous or autonomous mode in a second category of driving conditions decreases the rate premium, display an additional recommendation to increase operation of the semi-autonomous or autonomous vehicle in the semi-autonomous or autonomous mode in the second category of driving conditions.

5. The system of claim 1, wherein the computer-executable instructions are configured to cause the processor to disable receiving a third set of data from the vehicle system after the rate premium is adjusted.

6. The system of claim 1, wherein the first set of data comprises performance of the semi-autonomous or autonomous vehicle operating in the semi-autonomous or autonomous mode in different driving conditions.

7. The system of claim 1, wherein the first set of data comprises a driving record.

8. The system of claim 1, wherein the second set of data comprises a number of miles driven by different drivers of the semi-autonomous or autonomous vehicle.

9. A system, comprising:
a vehicle system configured to monitor one or more user-selected monitor variables related to operating an autonomous or semi-autonomous vehicle via one or more sensors;
a processor; and
a memory storing computer-executable instructions, wherein the computer-executable instructions are configured to cause the processor to:
receive, via a user selection, the one or more user-selected monitor variables to monitor;
receive a first set of data from the vehicle system, wherein the first set of data corresponds to the one or more user-selected monitor variables;
determine a rate premium based on the first set of data;
display a visualization comprising the rate premium on a display;
in response to determining that reducing operation of the semi-autonomous or autonomous vehicle in a semi-autonomous or autonomous mode in a category of driving conditions decreases the rate premium, display a recommendation to reduce operation of the semi-autonomous or autonomous vehicle in the semi-autonomous or autonomous mode in the category of driving conditions;
receive a second set of data from the vehicle system after receiving the first set of data, wherein the second set of data corresponds to the one or more user-selected monitor variables;
determine accident liability using the first set of data, the second set of data, or both, in response to determining that an accident has occurred;
determine damage to the autonomous or semi-autonomous vehicle or to an additional vehicle involved in the accident using feedback from the one or more sensors;
transmit the determination of accident liability;
adjust the rate premium based on the second set of data; and
display an adjusted rate premium.

10. The system of claim 1, wherein the category of driving conditions comprises driving in an urban environment.

11. The system of claim 1, wherein determining damage to the autonomous or semi-autonomous vehicle or to the additional vehicle comprises determining one or more locations of the damage and an extent of the damage at each location of the one or more locations.

12. The system of claim 9, wherein the computer-executable instructions are configured to cause the processor to, in response to determining that increasing operation of the semi-autonomous or autonomous vehicle in the semi-autonomous or autonomous mode in a second category of driving conditions decreases the rate premium, display an additional recommendation to increase operation in the autonomous or semi-autonomous mode in the second category of driving conditions.

13. The system of claim 9, wherein the computer-executable instructions are configured to cause the processor to display an additional recommendation to update an autonomous or semi-autonomous driving program configured to at least partially operate the autonomous or semi-autonomous vehicle to a latest version.

14. The system of claim 9, wherein the computer-executable instructions are configured to cause the processor to employ data related to the vehicle system and data from an external database to determine the rate premium.

15. A system, comprising:
a vehicle configured to operate in semi-autonomous or autonomous driving modes, the vehicle comprising:
one or more sensors configured to collect data corresponding to one or more user-selected monitor variables related to operation of the vehicle;
a processor;
a memory storing computer-executable instructions, wherein the computer-executable instructions are configured to cause the processor to:
receive the one or more user-selected monitor variables;

receive the data corresponding to the one or more user-selected monitor variables from the one or more sensors;

determine a rate premium based on the data;

in response to determining that reducing operation of the vehicle in the semi-autonomous or autonomous mode in a category of driving conditions decreases a rate premium, display a recommendation to reduce operation of vehicle in the semi-autonomous or autonomous mode in the category of driving conditions; and determine accident liability using the data corresponding to the one or more user-selected monitor variables in response to determining an accident has occurred;

determine damage to the vehicle or to an additional vehicle involved in the accident using feedback from the one or more sensors; and a transmitter coupled to the processor, wherein the transmitter is configured to receive a determination of accident liability from the processor and wirelessly transmit the determination of accident liability.

16. The system of claim 15, wherein the one or more sensors comprise a video camera, an infrared camera, a radar, a laser, an accelerometer, a speedometer, or any combination thereof.

17. The system of claim 15, wherein the computer-executable instructions are configured to cause the processor to control operation of the vehicle in the semi-autonomous or autonomous driving modes using the data from the one or more sensors.

18. The system of claim 15, wherein the transmitter is configured to transmit the determination of accident liability to a mobile device.

19. The system of claim 15, wherein the computer-executable instructions are configured to cause the processor to order parts in response to a type of damage to the vehicle or the additional vehicle.

20. The system of claim 15, wherein the data corresponding to the one or more user-selected monitor variables collected by the one or more sensors comprises a location of the vehicle, general operation of the vehicle, operation of the vehicle at a stop sign, operation of the vehicle at a yield sign, operation of the vehicle at a traffic sign, operation of the vehicle at a traffic light, an additional location of the additional vehicle, general operation of the additional vehicle, operation of the additional vehicle at the stop sign or at an additional stop sign, operation of the additional vehicle at the yield sign or at an additional yield sign, operation of the additional vehicle at the traffic sign or at an additional traffic sign, operation of the additional vehicle at the traffic light or at an additional traffic light, or any combination thereof.

* * * * *